(12) United States Patent
Morris et al.

(10) Patent No.: US 8,438,683 B1
(45) Date of Patent: May 14, 2013

(54) SLIDING FOLD OUT RAMP

(75) Inventors: Donald Morris, Littleton, CO (US); David Johnson, Modesto, CA (US)

(73) Assignee: Lift-U, Division of Hogan Mfg., Inc., Escalon, CA (US)

( * ) Notice: Subject to any disclaimer, the term of this patent is extended or adjusted under 35 U.S.C. 154(b) by 78 days.

(21) Appl. No.: 13/231,756

(22) Filed: Sep. 13, 2011

Related U.S. Application Data (60) Provisional application No. 61/382,295, filed on Sep. 13, 2010.

(51) Int. Cl.
*E01D 1/00* (2006.01)

(52) U.S. Cl.
USPC .............................. 14/71.1; 414/537; 414/921

(58) Field of Classification Search ................... 14/71.1, 14/71.3; 414/537, 921
See application file for complete search history.

(56) References Cited

U.S. PATENT DOCUMENTS

| | | | | |
|---|---|---|---|---|
| 5,110,250 A | * | 5/1992 | Kuo | 414/229 |
| 5,312,149 A | * | 5/1994 | Boone | 296/61 |
| 5,373,915 A | * | 12/1994 | Tremblay | 187/201 |
| 5,865,593 A | * | 2/1999 | Cohn | 414/546 |
| 6,186,733 B1 | * | 2/2001 | Lewis et al. | 414/537 |
| 6,343,908 B1 | * | 2/2002 | Oudsten et al. | 414/537 |
| 6,536,064 B1 | * | 3/2003 | Swink et al. | 14/69.5 |
| 6,866,464 B2 | * | 3/2005 | Kellogg et al. | 414/537 |
| 8,122,553 B1 | * | 2/2012 | Johnson et al. | 14/71.3 |
| 8,132,281 B1 | * | 3/2012 | Johnson et al. | 14/71.3 |
| 8,181,300 B1 | * | 5/2012 | Johnson et al. | 14/71.3 |

* cited by examiner

*Primary Examiner* — Gary Hartmann
(74) *Attorney, Agent, or Firm* — Christensen O'Connor Johnson Kindness PLLC (57) ABSTRACT

A ramp assembly is suitable for use in a vehicle to provide a transition surface from the vehicle floor to an alighting surface. The ramp assembly includes an inner panel fixedly associated with the vehicle floor and ramp support slidingly associated with the inner panel. The ramp support is reciprocal between (1) a retracted position when the ramp assembly is in a stowed position and (2) an extended position when the ramp assembly is in a deployed position. A ramp portion is rotatably coupled at a first end to a first end of the ramp support. An intermediate panel is coupled to the ramp support and extends from the inner panel to the ramp portion when the ramp assembly is in the deployed position. When the ramp assembly is in the stowed position, the ramp portion extends inwardly from the first end of the ramp support.

20 Claims, 8 Drawing Sheets

SLIDING FOLD OUT RAMP

CROSS-REFERENCE TO RELATED APPLICATION

This application claims the benefit of U.S. Provisional Application No. 61/382,295, filed Sep. 13, 2010, the disclosure of which is expressly incorporated by reference.

FIELD OF THE INVENTION

The present disclosure relates generally to wheelchair ramps and, more particularly, to sliding fold out ramps for vehicles.

BACKGROUND

The Americans with Disabilities Act (ADA) requires the removal of physical obstacles to those who are physically challenged. The stated objective of this legislation has increased public awareness and concern over the requirements of the physically challenged. Consequentially, there has been more emphasis in providing systems that assist such a person to access a motor vehicle, such as a bus or minivan.

A common manner of providing the physically challenged with access to motor vehicles is a ramp. Various ramp operating systems for motor vehicles are known in the art. Some slide out from underneath the floor of the vehicle and tilt down. Others are stowed in a vertical position and are pivoted about a hinge, while still others are supported by booms and cable assemblies. The present invention is generally directed to a "fold out" type of ramp. Such a ramp is normally stowed in a horizontal position within a recess in the vehicle floor, and is pivoted upward and outward to a downward-sloping deployed position. In the deployed position, the ramp is adjustable to varying curb heights.

Fold out ramps on vehicles confront a variety of technical problems. Longer ramps are desirable because the resulting slope is lower and more accessible by wheelchair-bound passengers. However, the ramp length is typically limited by the space available in the vehicle. Elements such as vehicle chassis structure, suspension, passenger seats, driver platforms, and fare boxes prohibit longer ramps. As a result the ramp slopes are steeper than desired, and although presently ADA compliant, are unmanageable by the mobility impaired without assistance. Further, longer ramps are heavier and require more torque about the pivot axis to be reciprocated between deployed and stowed positions. To satisfy this torque requirement, such fold out ramps use large electric motors, pneumatic devices, or hydraulic actuators to deploy and stow the ramp. Many of such systems cannot be moved manually in the event of failure of the power source unless the drive mechanism is first disengaged. Some existing fold out ramps can be deployed or stowed manually, but they are difficult to operate because one must first overcome the resistance of the drive mechanism.

Proposed changes to the ADA require that ramps should have overall slopes not steeper than 1:6 (17 percent) when deployed to boarding and alighting areas without station platforms and to the roadway. Typical ramps manufactured today are generally designed to provide a 1:4 (25 percent) slope when deployed. Although these ramps could be lengthened to provide a slope of 1:6 or less, as previously mentioned, longer ramps are heavier and require a greater actuation force. Moreover, longer ramps require a larger installation envelope within the vehicle floor. Thus, there exists a need for a compact fold out ramp that when stowed occupies a small amount of space within the vehicle floor, yet deploys to a length that effectively reduces the ramp slope encountered by the mobility impaired to a maximum rise to run ratio of 1:6 or less to facilitate greater independence and safety for wheelchair-bound passengers, and wherein the actuation forces to operate the ramp are minimized.

SUMMARY

A disclosed ramp assembly is suitable for use with a vehicle having a floor. One embodiment of the ramp assembly includes an inner panel fixedly associated with the vehicle floor. A ramp support slidingly is associated with the inner panel to reciprocate between a retracted position when the ramp assembly is in a stowed position and an extended position when the ramp assembly is in a deployed position. A ramp portion is rotatably coupled at a first end to a first end of the ramp support, and an intermediate panel is fixedly coupled to the ramp support. The ramp portion extends inwardly from the first end of the ramp support when the ramp assembly is in the stowed position. When the ramp assembly is in the deployed position, the intermediate panel provides a transition surface from the inner panel to the ramp portion.

A second claimed embodiment of a ramp assembly includes a ramp support slidingly associated with the floor of a vehicle so that the ramp support is reciprocal between a retracted position when the ramp assembly is in a stowed position and an extended position when the ramp assembly is in a deployed position. A ramp portion is rotatably coupled at a first end to a first end of the ramp support. When the ramp assembly is in the stowed position, the ramp portion extends inwardly from the first end of the ramp support. When the ramp assembly is in the deployed position, the ramp portion extends outwardly from the first end of the ramp support. The ramp assembly further includes a panel fixedly coupled to the ramp support. The panel provides a transition surface extending inwardly and upwardly from the first end of the ramp portion when the ramp portion is in the deployed position. When the ramp assembly is in the stowed position, the ramp portion is disposed above the panel.

A third claimed embodiment of a ramp assembly includes an inner panel fixedly associated with the floor of a vehicle. A ramp support is slidingly associated with the inner panel to be reciprocal between a retracted position when the ramp assembly is in a stowed position and an extended position when the ramp assembly is in a deployed position. The ramp assembly further includes a ramp portion rotatably coupled at a first end to a first end of the ramp support. When the ramp assembly is in the deployed position, the ramp portion extends in an outward and downward direction. When the ramp assembly is in the stowed position, the ramp portion extends in an inward and upward direction. The ramp portion is at least partially disposed above the inner panel when the ramp assembly is in the stowed position.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Exemplary embodiments of the presently disclosed ramp assembly will now be described with reference to the accompanying drawings where like numerals correspond to like elements. Exemplary embodiments of the present disclosure are directed to ramp assemblies, and more specifically, to wheelchair ramp assemblies. In particular, several embodiments of the present invention are directed to wheelchair ramp assemblies suitable for use in buses, vans, etc. Several embodiments are directed to compact ramp assemblies for a vehicle that when stowed, occupy a small amount of space within the vehicle floor, yet deploy to a length that effectively reduces the ramp slope encountered by the mobility impaired, thus facilitating greater independence and safety for wheelchair-bound passengers.

The following discussion proceeds with reference to examples of wheelchair ramp assemblies for use in vehicles having a floor, such as a bus, van, etc. While the examples provided herein have been described with reference to their association with vehicles, it will be apparent to one skilled in the art that this is done for illustrative purposes and should not be construed as limiting the scope of the invention, as claimed. Thus, it will be apparent to one skilled in the art that aspects of the disclosed embodiments may be employed with other ramp assemblies used in stationary installations, such as residential buildings and the like.

The following detailed description may use illustrative terms such as vertical, horizontal, front, rear, inboard, curbside, roadside, outboard, proximal, distal, etc. These terms are descriptive in nature and should not be construed as limiting. Further, it will be appreciated that embodiments of the present disclosure may employ any combination of features described herein.

In the disclosed exemplary embodiment, the ramp is configured to provide a maximum 1:6 slope when deployed to the ground. It should be appreciated that the disclosed embodiment is exemplary and that the configuration can be modified to provide for greater or smaller maximum slopes, and also to provide predetermined maximum slopes when the ramp is deployed to other alighting surfaces. These and other alternate configurations are contemplated and should be considered within the scope of the present disclosure.

Figure 1:
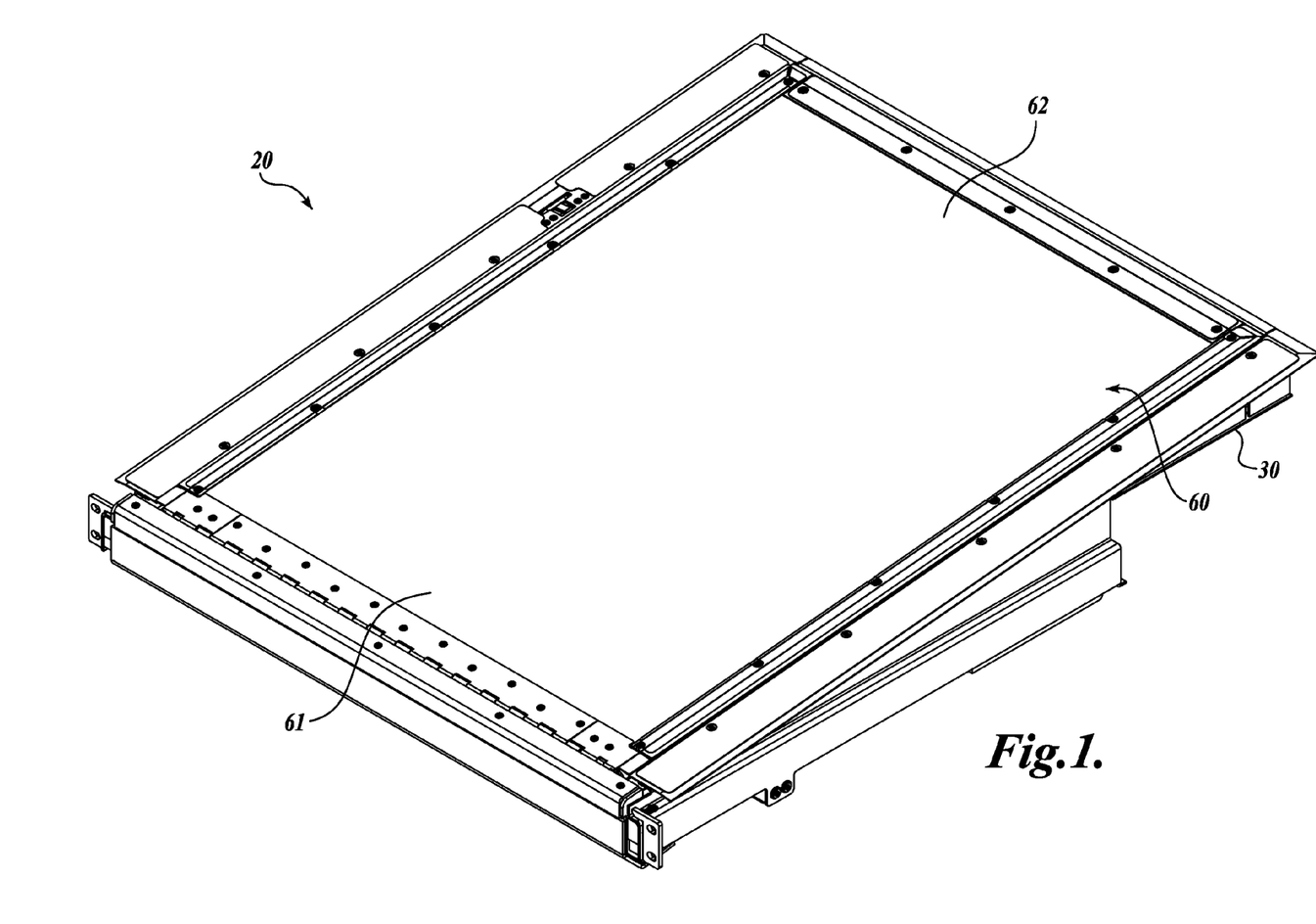
FIG. 1 is an isometric view of an exemplary embodiment of a ramp assembly, with a ramp portion in a stowed position.
Figure 2:
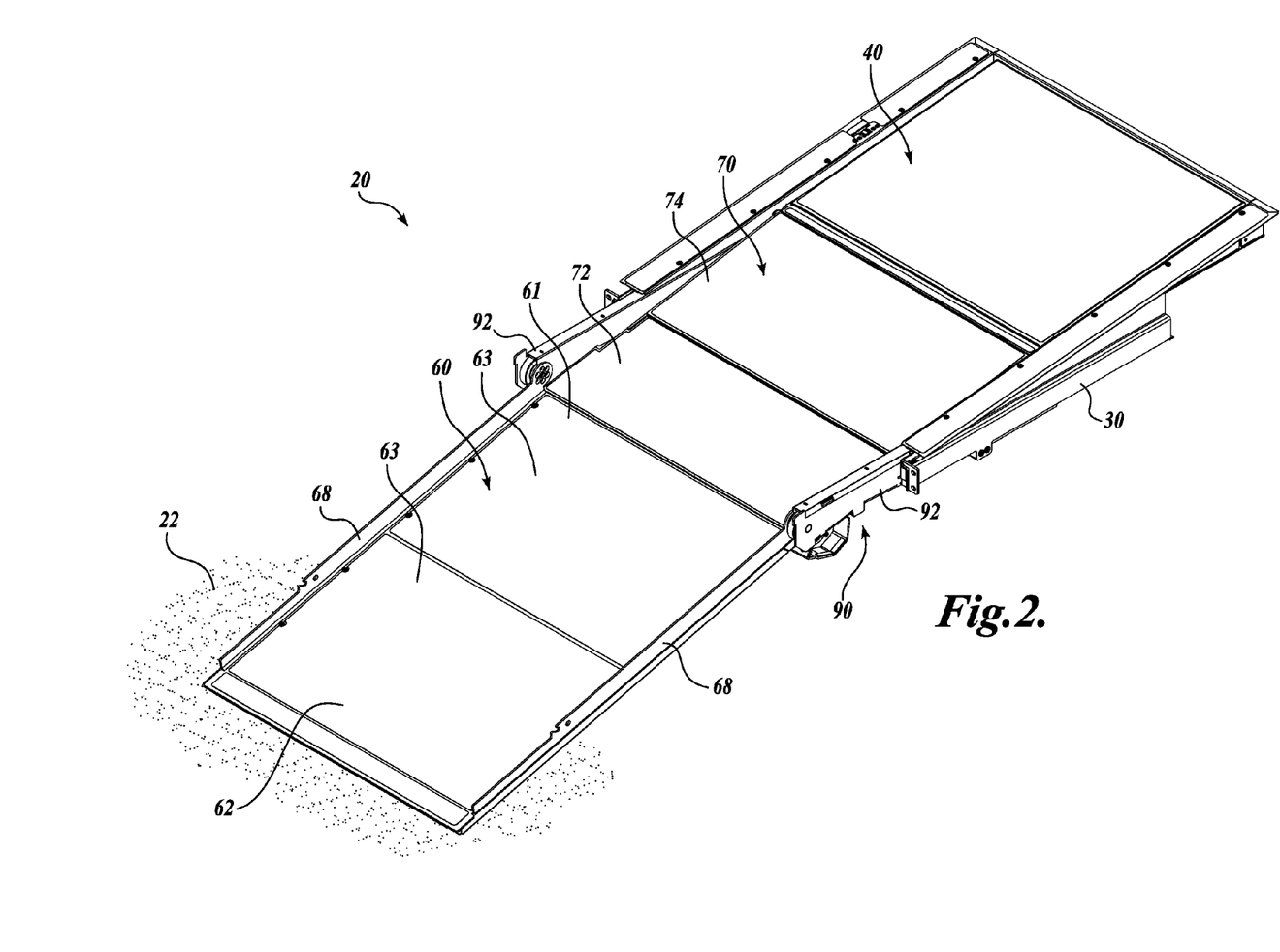
FIG. 2 is an isometric view of the ramp assembly shown in FIG. 1, with the ramp portion in a deployed position.
Figure 3:
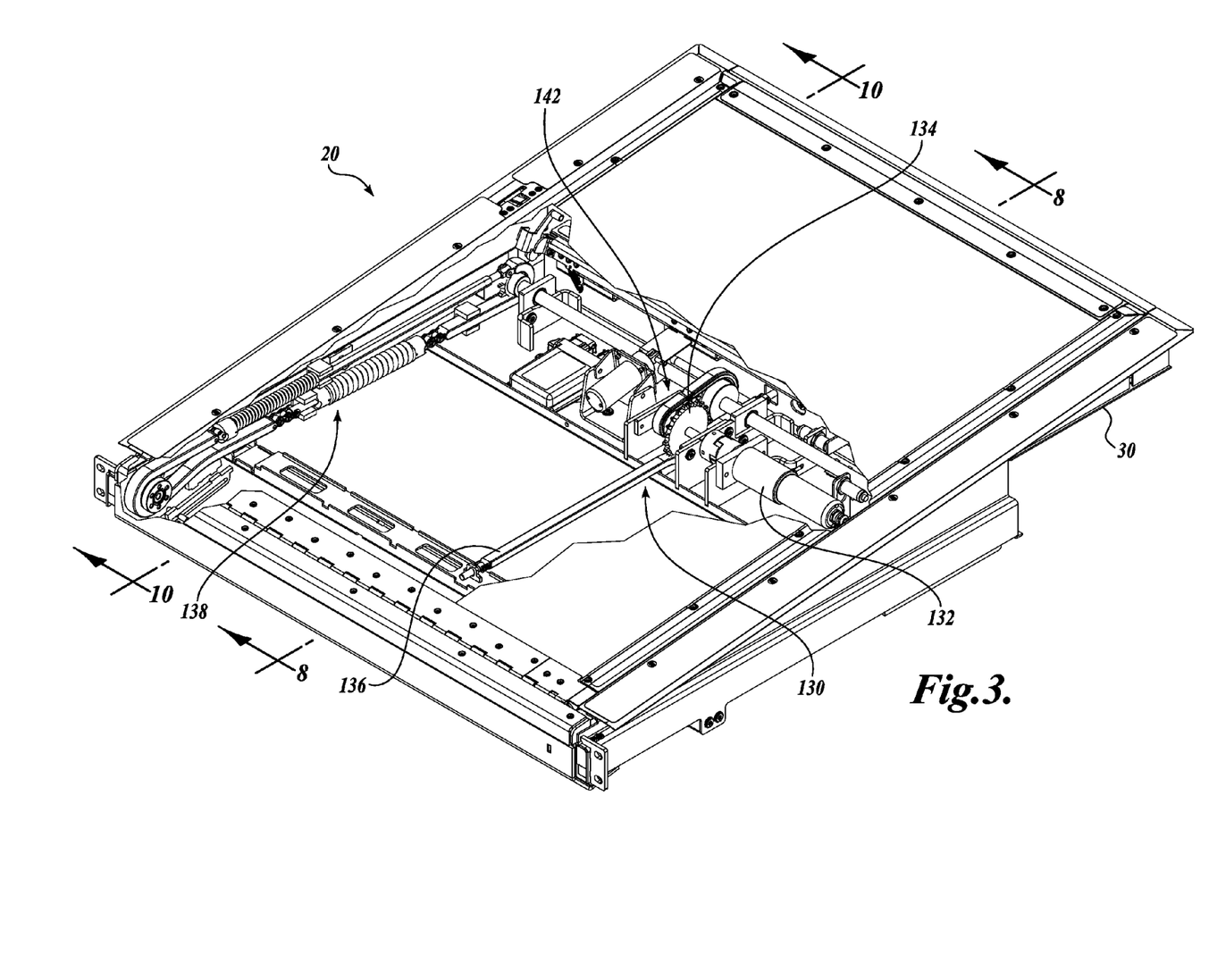
FIG. 3 is an isometric view of the ramp assembly shown in FIG. 1 in the stowed position, with a portion of the ramp assembly broken away to show a drive assembly.
Figure 4:
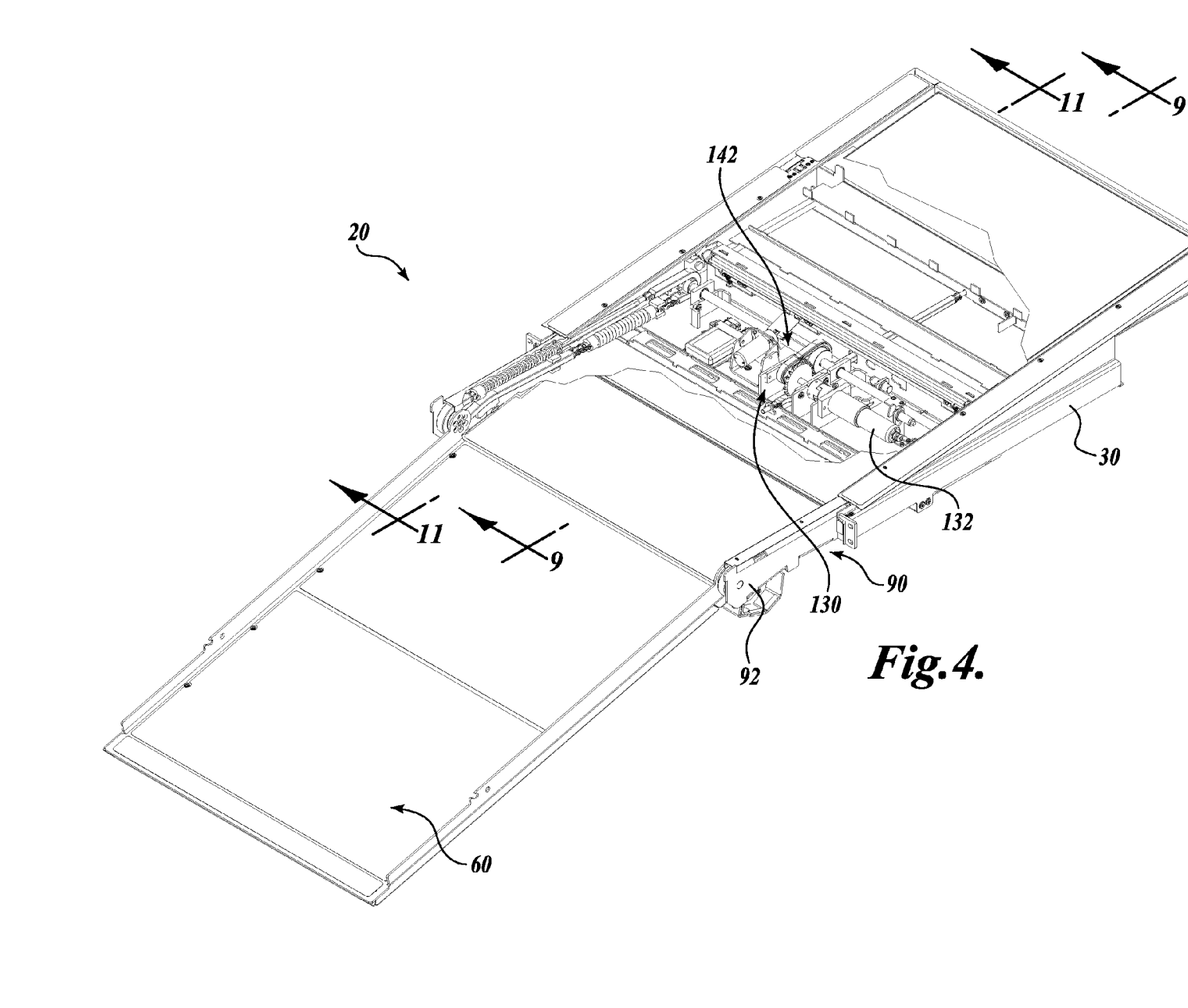
FIG. 4 is an isometric view of the ramp assembly shown in FIG. 1 in a deployed position, with a portion of the ramp assembly broken away to show the drive assembly.

Referring to FIGS. 1 and 2, one exemplary embodiment of a disclosed ramp assembly 20 is reciprocal between a stowed position, as shown in FIG. 1, and a deployed position, as shown in FIG. 2. Referring specifically to FIG. 2, the ramp assembly 20 includes a ramp portion 60, an intermediate panel 70, and an inner panel 40. As shown in FIGS. 3 and 4, the ramp assembly 20 further includes a frame 30, a ramp support 90 slidably mounted to the frame 30, and a drive assembly 130.

As will be described in greater detail, the ramp portion 60 is rotatably coupled to the ramp support 90 to reciprocate between the stowed position (FIG. 1) and a deployed position (FIG. 2). As the ramp portion 60 moves from the stowed position to a deployed position, the ramp support 90 translates relative to the frame 30 to move the pivot axis of the ramp portion, thereby effectively increasing the overall length of the ramp assembly 20. By increasing the length of the ramp assembly 20 in this manner, the maximum slope of the deployed ramp assembly can be decreased for a given vertical distance between the vehicle floor and the alighting surface.

The frame 30 is adapted to be mounted to a vehicle (not shown) having a floor, such as a bus or a van. Although the illustrated embodiments of the ramp assembly 20 include a frame 30, other embodiments are contemplated in which the ramp assembly 20 does not include a frame 30. When such embodiments are installed in vehicles, the ramp assembly 20 components are attached directly to the structure of the vehicle or to a suitable structure within the vehicle, thus making a frame 30 unnecessary. More specifically, in the absence of a frame 30, the ramp support 90 may be slidably coupled to a suitable portion of the vehicle structure. Other ramp assembly components may also be attached to suitable portions of the vehicle structure as necessary. Similarly, when such embodiments are installed in stationary installations, such as residential buildings and the like, the ramp assembly 20 components are attached to the structure of the building or any other suitable structure within the building. Accordingly, embodiments of the described ramp assembly 20 that do not include a frame should be considered within the scope of the present disclosure.

Referring to FIGS. 1 and 2, the ramp portion 60 has a first end 61 and a second end 62. When the ramp portion 60 is in the stowed position, the first end 61 of the ramp portion 60 is outboard (curbside) of the second end 62 of the ramp portion 60. As the ramp portion 60 moves from the stowed position to a deployed position, the ramp portion 60 rotates about the first end 61 of the ramp portion 60 until the second end 62 of the ramp portion 60 is outboard (curbside) of the first end 61 of the ramp portion 60.

Figure 8:
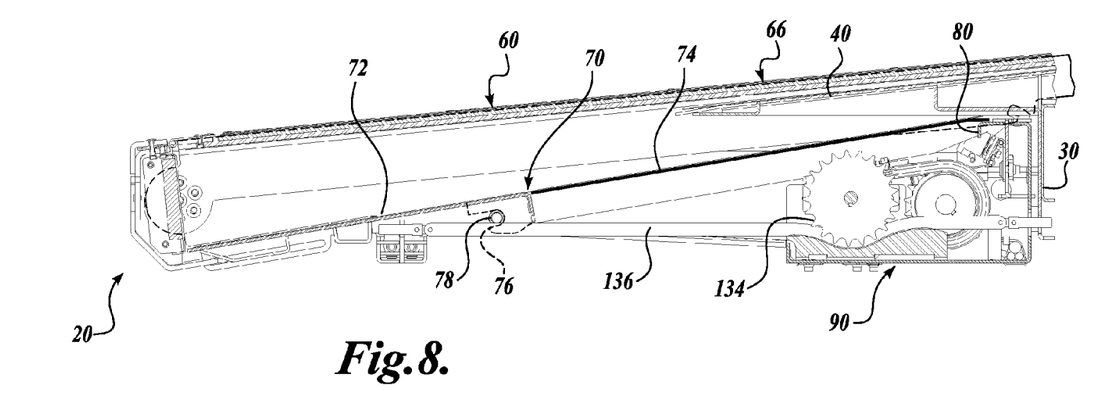
FIG. 8 is a side sectional view of the ramp assembly shown in FIG. 1, with the ramp portion in the stowed position.

As shown in FIGS. 1 and 8, when the ramp assembly 20 is in the stowed position, the ramp portion 60 and the inner panel 40 are located such that the ramp portion 60 is positioned over the inner panel 40, and the lower surface 66 of the ramp portion 60 faces upward to provide a walking surface. The intermediate panel 70 is also disposed under the ramp portion 60. As shown in FIG. 8, in the disclosed embodiment, a portion of the intermediate panel 70 is also disposed under the inner panel 40, although configurations are contemplated wherein the intermediate panel 70 is disposed laterally to the inner panel 40 such that the intermediate panel does not extend under the inner panel when the ramp portion 60 is in the stowed position.

Referring now to FIG. 2, the ramp portion 60 is pivotally connected at the first end 61 to the ramp support 90. The ramp portion 60 includes one or more panels 63, which are constructed from well-known materials. The ramp portion 60 further includes side curbs 68 that extend upwardly from the forward and rear sides of the panel 63. Each side curb 68 enhances the structural strength of the ramp portion 60 and provides edge guards for the sides of the ramp portion 60, thereby increasing the safety of the ramp assembly 20.

The ramp support 90 is slidably coupled to the frame 30 for reciprocating motion in an inboard/outboard direction. In the illustrated embodiment, the ramp support 90 includes a pair of support rails 92, one support rail being positioned toward the forward end of the ramp assembly 20, and the other support rail being positioned toward the rear end of the ramp assembly (see FIGS. 1-2 and 6-7). The support rails extend and retract into the frame 30, thereby translating the axis of rotation of the ramp portion 60 inboard and outboard. It should be appreciated that the ramp support is not limited to the disclosed number and location of the support rails 92. In this regard, any number of suitable configurations can be implemented to translate the axis of rotation of the ramp portion 60.

Figure 9:
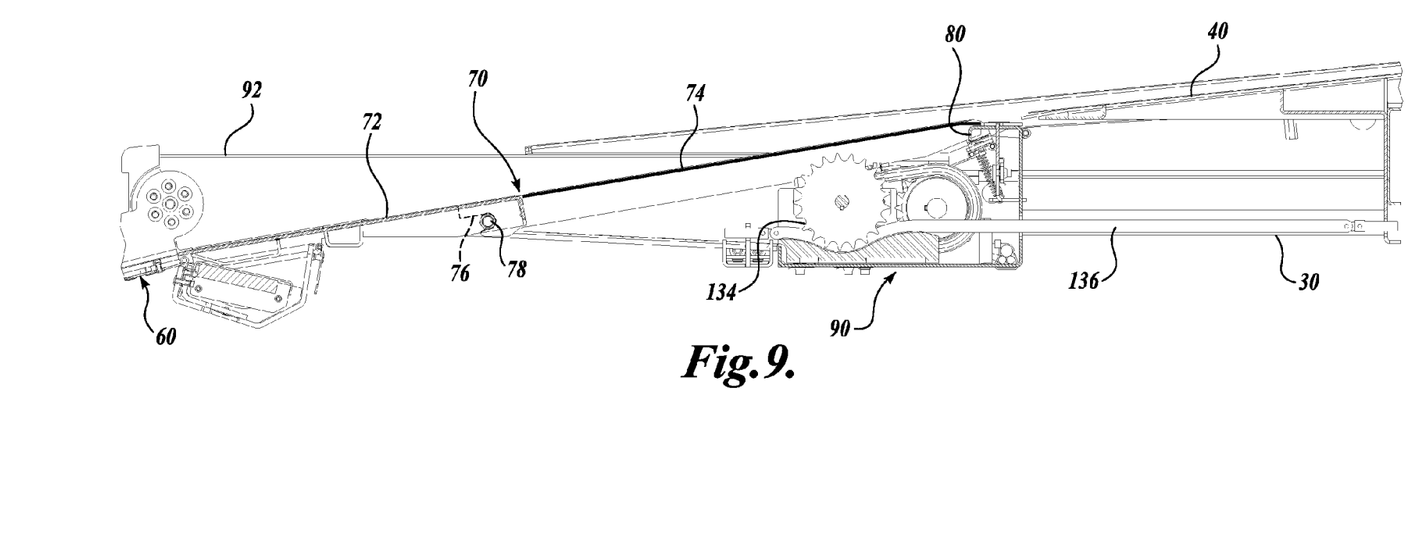
FIG. 9 is a partial side sectional view of the ramp assembly shown in FIG. 1, with the ramp portion in a deployed position.

The intermediate panel 70 is associated with the ramp support 90 so that the intermediate panel moves with the ramp support when the ramp support reciprocates in the inboard/outboard direction. As shown in FIGS. 2 and 9, when the ramp portion 60 is in a deployed position, the intermediate ramp 70 provides a transition between the inner panel 40, which has a fixed position relative to the vehicle floor, and the ramp portion 60. In the illustrated embodiment, the upper surfaces of the ramp portion 60, the intermediate panel 70, and the inner panel 40 are approximately parallel when the ramp is in a deployed position so that the upper surfaces cooperate to provide a generally contiguous transition surface from the vehicle floor to the alighting surface 22. It should be appreciated, however, that the upper surfaces can be positioned to have angles other than generally 180° therebetween when the ramp portion 60 is in a deployed position. In this regard, the ramp assembly 20 can accommodate alighting surfaces having a range of vertical distances from the floor of the vehicle, each potentially resulting in different slopes at the ramp portion 60, the intermediate panel 70 and the inner panel 40.

Referring to FIGS. 8 and 9, the intermediate panel 70 of the illustrated embodiment includes a fixed panel 72 located outboard of an access panel 74. The fixed panel is secured relative to the ramp support 90 to maintain a fixed position relative to the ramp support 90. The access panel 74 includes a clevis 76 at the outboard end that rotatably engages a pin 78 secured to the ramp support 90 so that the access panel is rotatable about the centerline of the pin 78. The inboard end of the access panel 74 is supported by a lip 80 formed on the ramp support 90. The weight of the access panel keeps the panel in place during operation. At the same time, the access panel 74 can be removed by lifting the inboard end to rotate the access panel about the centerline of the pin 78 and then lifted to disengage the clevis 76 from the pin.

Still referring to FIGS. 8 and 9, the inner panel 40 is fixed relative to the frame 30 and is oriented to have an angle approximately equal to that of the vehicle floor. The inner panel is located so that at least a portion of the ramp support 90 and the intermediate panel 70 are disposed below the inner panel when the ramp support is in a retracted position, i.e., when the ramp assembly 20 is in the stowed position.

Figure 5:
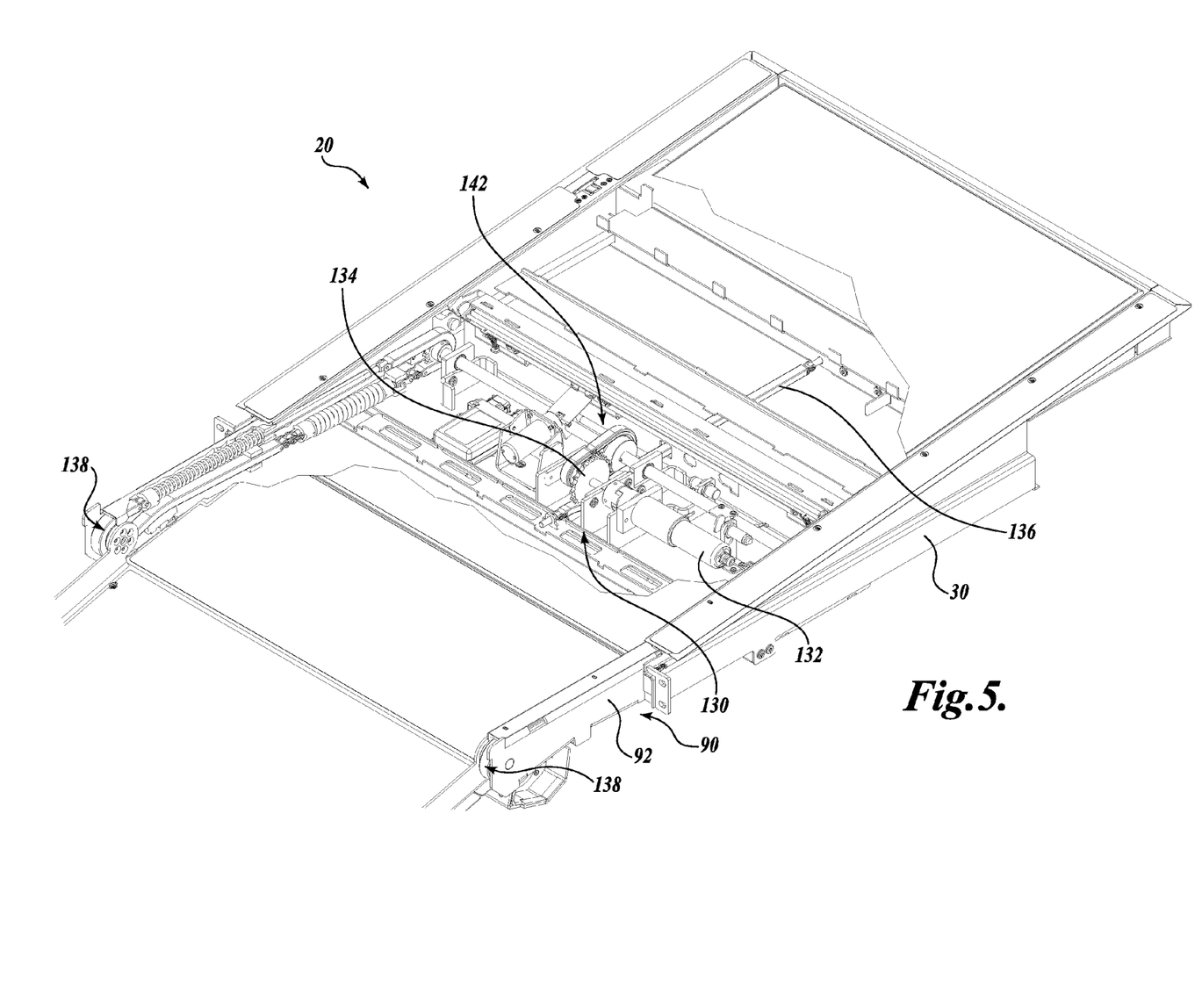
FIG. 5 is a partial isometric view of the ramp assembly shown in FIG. 1 in a deployed position, with a portion of the ramp assembly broken away to show the drive assembly.
Figure 6:
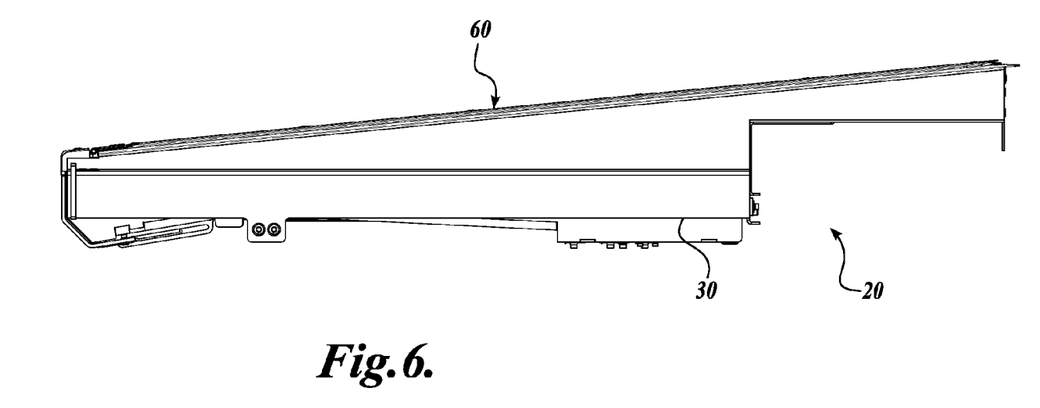
FIG. 6 is a side view of the ramp assembly shown in FIG. 1, with the ramp portion in the stowed position.
Figure 7:
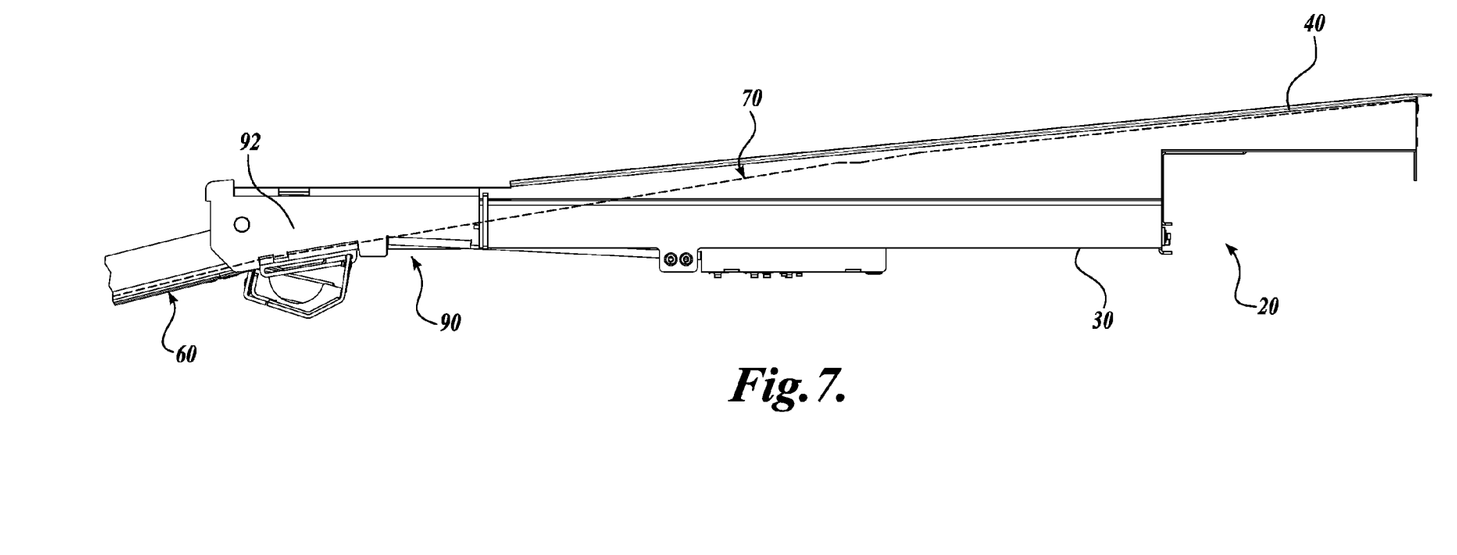
FIG. 7 is a partial side view of the ramp assembly shown in FIG. 1, with the ramp portion in a deployed position.

Referring now to FIGS. 3-5, the drive assembly 130 will be described. The drive assembly 130 slides the ramp support 90 inboard and outboard and also rotates the ramp portion 60 between the stowed position and a deployed position. The drive assembly 130 includes a selectively operable motor 132 secured to the ramp support 90. The motor 132 is operably coupled to a sprocket 134 that engages a chain segment 136. The chain segment 136 is fixedly secured relative to the frame 30 having its extended length oriented in an inboard/outboard direction. The sprocket 134 engages the chain segment 136 so that rotation of the sprocket moves the sprocket along the length of the chain segment, thereby selectively translating the ramp support 90 in the inboard/outboard direction. More specifically, rotation of the sprocket 134 in a first direction moves the ramp support 90, and therefore the ramp portion 60, in an inboard direction, and rotation of the sprocket in a second direction moves the ramp support 90 in an outboard direction.

While the disclosed drive assembly uses an electric motor to translate the ramp support inboard and outboard, it should be appreciated that various other actuators can be used to move the ramp support in the inboard/outboard direction. In this regard, the ramp assembly 20 can be modified to include hydraulic actuators, pneumatic actuators, or any other suitable device for selectively reciprocating the ramp support 90 inboard and outboard. Moreover, the drive assembly is not limited to the sprocket/chain segment combination described above, but can instead include a rack and pinion, one or more linkages, a separate linear actuator, or any other suitable configuration to reciprocate the ramp support between the stowed and deployed positions. These and other alternate drive assemblies are contemplated and should be considered within the scope of the present disclosure.

Figure 10:
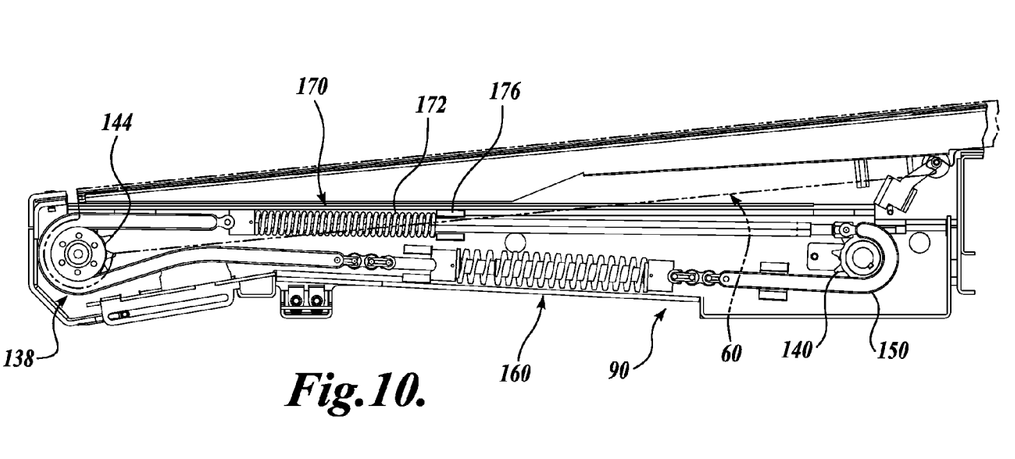
FIG. 10 is a side sectional view of the ramp assembly shown in FIG. 1, with the ramp portion in the stowed position.
Figure 11:
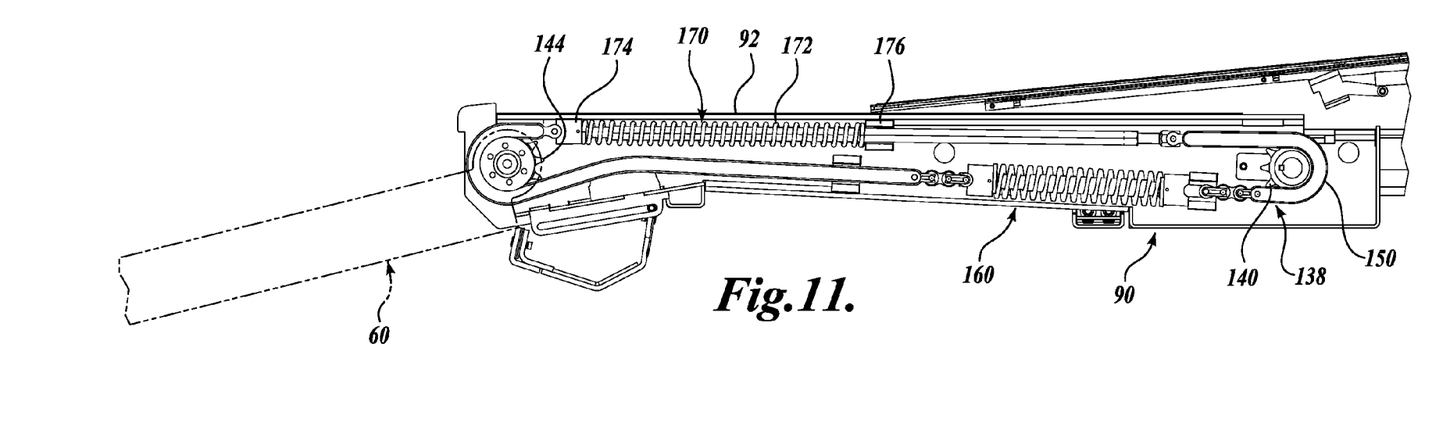
FIG. 11 is a partial side sectional view of the ramp assembly shown in FIG. 1, with the ramp portion in a deployed position.

In addition to reciprocating the ramp support 90 between an inboard position and an outboard position, the drive assembly 130 also includes first and second drive subassemblies 138 to actuate the ramp portion 60 to rotate between the stowed position and a deployed position. Referring to FIGS. 5, 10, and 11, the first drive subassembly 138 is located on a rear end of the ramp support 90 and the second drive subassembly is located on a forward end of the ramp support 90. The first drive subassembly 138 is similar to the second drive subassembly 138 except for location, wherein each element of the first drive subassembly corresponds to a similar element of the second drive subassembly. For the sake of clarity, the first drive subassembly 138 is described herein with the understanding that unless otherwise indicated, each element of the first drive subassembly has a corresponding element on the second drive subassembly. It should be appreciated that although forward and rear drive subassemblies 138 are included on the disclosed embodiment, a single drive subassembly can be used to reciprocate the ramp portion between the stowed position and a deployed position. Moreover, such a drive subassembly can be located at the forward end of the ramp support 90, a rear end of the ramp support, or in any other suitable location.

Still referring to FIGS. 10 and 11, the drive subassembly 138 includes a drive sprocket 140 that is rotatably coupled to the inboard end of the rear side of the ramp support 90. The drive sprocket 140 is oriented to have an axis of rotation that extends in the forward/rearward direction. As best shown in FIGS. 3-5, the drive sprocket 140 is operably coupled to sprocket 134 by a transmission 142. Rotation of sprocket 134 by motor 132 synchronizes the reciprocating ramp support 90 with the rotation of ramp portion 60. It should be appreciated that any suitable transmission can be used to operably couple the motor 132 to the drive sprocket 140 (drive element). In addition, alternate embodiments are contemplated wherein the drive subassemblies 138 are actuated independent of the motor 132. In this regard, separate motors or other suitable actuators can be utilized to drive the rotation of the ramp portion 60 between the stowed position and a deployed position.

Referring back to FIGS. 10 and 11, the drive subassembly 138 further includes an outboard sprocket 144 (drive support) rotatably associated with the ramp support 90 and coupled to the ramp portion 60 so that rotation of the outboard sprocket 144 rotates the ramp portion 60 between the stowed and deployed positions. An endless loop 150 operably couples the drive sprocket 140 to the outboard sprocket 144 so that rotation of the output shaft of the motor rotates the drive sprocket, which in turn rotates the outboard sprocket and, consequently, the ramp portion 60. As a result, the ramp portion 60 can be selectively reciprocated between the stowed position and a deployed position by selectively actuating the motor 132.

In the illustrated embodiment, the endless loop 150 includes an integrated counterbalance 160. The counterbalance is similar in form and function to the lower spring assembly (122) disclosed in U.S. Pat. No. 7,533,432, issued to Morris et al., the contents of which are incorporated by reference herein. It should be appreciated that other embodiments are contemplated in which other known counterbalances are employed, and such embodiments should be considered within the scope of the present disclosure.

Still referring to FIGS. 10 and 11, the drive subassembly also includes a kick-off assembly 170 to provide an additional biasing force as the ramp portion initially begins to move away from the stowed position. The kick-off assembly 170 includes a kick-off spring 172, a spring fitting 174, and a restraint 176. The spring fitting 174 moves with the endless loop 150 to compress the spring 172 against the restraint 176 when the ramp portion 60 is in the stowed position. The compressed spring 172, in turn, provides a biasing force that biases the ramp portion 60 away from the stowed position, thereby reducing the force required to initially move the ramp portion from the stowed position. Such a biasing force is particularly useful when the ramp is manually deployed, as it reduces the initial force required to rotate the ramp portion 60 from its stowed position.

As the ramp portion 60 moves from the stowed position, the spring fitting 174 moves away from the restraint 176, and the spring 172 decompresses. As the spring 172 decompresses, the biasing force provided by the spring is reduced until the spring is in a relaxed state, in which no biasing force is provided by the spring.

The described ramp assembly provides for a compact fold out ramp that when stowed occupies a small amount of space within the vehicle floor, yet deploys to a length that effectively reduces the ramp slope encountered by the mobility impaired to a maximum rise to run ratio of 1:6, and wherein the actuation forces to operate the ramp are minimized. It should be appreciated that the disclosed embodiment is exemplary and that the configuration can be modified to provide for greater or smaller ramp rise to run ratios. In this regard, the length of the ramp, the travel of the ramp support, and other features of the disclosed ramp assembly can be modified to provide any suitable rise to run ratio, including 1:4, 1:8, 1:10 or any other desired ratio. These and other alternate configurations are contemplated and should be considered within the scope of the present disclosure.

While illustrative embodiments have been illustrated and described, it will be appreciated that various changes can be made therein without departing from the spirit and scope of the invention.

The embodiments of the invention in which an exclusive property or privilege is claimed are defined as follows:

1. A ramp assembly for a vehicle having a floor, the ramp assembly comprising:
   (a) an inner panel fixedly associated with the vehicle floor;
   (b) a ramp support slidingly associated with the inner panel, the ramp support being reciprocal between (1) a retracted position when the ramp assembly is in a stowed position and (2) an extended position when the ramp assembly is in a deployed position;
   (c) a ramp portion rotatably coupled at a first end to a first end of the ramp support; and
   (d) an intermediate panel coupled to the ramp support, the intermediate panel providing a transition surface from the inner panel to the ramp portion when the ramp assembly is in the deployed position, wherein the ramp portion extends inwardly from the first end of the ramp support when the ramp assembly is in the stowed position.

2. The ramp assembly of claim 1, wherein the ramp portion extends outwardly from the first end of the ramp support when the ramp assembly is in the deployed position.

3. The ramp assembly of claim 1, wherein the ramp portion extends in an inward and upward direction from the first end of the ramp support when the ramp is in the stowed position.

4. The ramp assembly of claim 3, wherein the ramp portion is at least partially disposed above the intermediate panel when the ramp assembly is in the stowed position.

5. The ramp assembly of claim 4, wherein the ramp portion is at least partially disposed above the inner panel when the ramp assembly is in the stowed position.

6. The ramp assembly of claim 4, wherein the intermediate panel is at least partially disposed below the inner panel when the ramp assembly is in the stowed position.

7. The ramp assembly of claim 1, wherein the ramp support comprises at least one support rail slidingly associated with the inner panel and fixedly coupled to the ramp support.

8. The ramp assembly of claim 7, further comprising a frame fixedly coupled to the vehicle, wherein the at least one support rail is slidingly coupled to the frame for translational movement between the retracted position and the extended position.

9. The ramp assembly of claim 1, wherein the ramp support reciprocates between the retracted position and the extended position along a substantially horizontal path.

10. A ramp assembly for a vehicle having a floor, the ramp assembly comprising:
    (a) a ramp support slidingly associated with the vehicle floor, the ramp support being reciprocal between (1) a retracted position when the ramp assembly is in a stowed position and (2) an extended position when the ramp assembly is in a deployed position;
    (b) a ramp portion rotatably coupled at a first end to a first end of the ramp support, the ramp portion extending (1) inwardly from the first end of the ramp support when the ramp assembly is in the stowed position and (2) outwardly from the first end of the ramp support when the ramp assembly is in the deployed position; and
    (c) a panel coupled to the ramp support, the panel providing a transition surface extending inwardly and upwardly from the first end of the ramp portion when the ramp portion is in the deployed position, wherein the ramp portion is disposed above the panel when the ramp assembly is in the stowed position.

11. The ramp assembly of claim 10, further comprising a drive assembly, the drive assembly comprising:
   (a) a motor fixedly coupled to the ramp support;
   (b) a sprocket selectively rotatable by the motor; and
   (c) a chain segment fixedly positioned relative to the vehicle floor, wherein the sprocket engages the chain segment such that selective rotation of the sprocket reciprocates the ramp support between the extended position and the retracted position.

12. The ramp assembly of claim 11, the drive assembly further comprising:
   (a) a first drive element selectively rotatable by the motor;
   (b) a second drive element fixedly coupled to the ramp portion; and
   (c) an endless loop operably coupled to the first and second drive elements such that rotation of the first drive element rotates the ramp portion about the first end of the ramp support.

13. The ramp assembly of claim 12, wherein each of the first and second drive elements comprises a sprocket, and the endless loop comprises a chain.

14. A ramp assembly for a vehicle having a floor, the ramp assembly comprising:
   (a) an inner panel fixedly associated with the vehicle floor;
   (b) a ramp support slidingly associated with the inner panel, the ramp support being reciprocal between (1) a retracted position when the ramp assembly is in a stowed position and (2) an extended position when the ramp assembly is in a deployed position;
   (c) a ramp portion rotatably coupled at a first end to a first end of the ramp support, the ramp portion extending (1) in an outward and downward direction when the ramp assembly is in the deployed position and (2) in an inward and upward direction when the ramp assembly is in the stowed position, wherein the ramp portion is at least partially disposed above the inner panel when the ramp assembly is in the stowed position.

15. The ramp assembly of claim 14, further comprising an intermediate panel coupled to the ramp support, the intermediate panel providing a transition surface from the inner panel to the ramp portion when the ramp assembly is in the deployed position.

16. The ramp assembly of claim 15, wherein the intermediate panel is at least partially disposed beneath the ramp portion when the ramp assembly is in the stowed position.

17. The ramp assembly of claim 16, wherein the intermediate panel is at least partially disposed beneath the inner panel when the ramp assembly is in the stowed position.

18. The ramp assembly of claim 14, further comprising a drive assembly, the drive assembly comprising:
   (a) a motor fixedly coupled to the ramp support;
   (b) a sprocket selectively rotatable by the motor; and
   (c) a chain segment fixedly associated with the vehicle floor, wherein the sprocket engages the chain segment such that selective rotation of the sprocket reciprocates the ramp support between the extended position and the retracted position.

19. The ramp assembly of claim 18, the drive assembly further comprising:
   (a) a first drive element selectively rotatable by the motor;
   (b) a second drive element fixedly coupled to the ramp portion; and
   (c) an endless loop operably coupled to the first and second drive elements such that rotation of the first drive element rotates the ramp portion about the first end of the ramp support.

20. The ramp assembly of claim 19, wherein each of the first and second drive elements comprises a sprocket, and the endless loop comprises a chain.

* * * * *